United States Patent [19]

Furutani et al.

[11] Patent Number: 5,288,311
[45] Date of Patent: Feb. 22, 1994

[54] DEVICE OF SUPPLYING A CONCENTRATED $CO_2$ GAS IN A CARBONATE SPRING BATH SYSTEM

[75] Inventors: Harumasa Furutani; Kazuyuki Kishishita, both of Hirakata; Hideaki Fukui, Shijonawate, all of Japan

[73] Assignee: Matsushita Electric Works, Ltd., Osaka, Japan

[21] Appl. No.: 950,151

[22] Filed: Sep. 24, 1992

[30] Foreign Application Priority Data

Sep. 24, 1991 [JP] Japan .................. 3-243846
Sep. 25, 1991 [JP] Japan .................. 3-246303
Jan. 27, 1992 [JP] Japan .................. 4-012443

[51] Int. Cl.$^5$ .............................. B01D 53/04
[52] U.S. Cl. .......................... 96/110; 96/112; 96/116; 96/127; 96/132; 96/133; 96/146; 55/269
[58] Field of Search ............ 55/68, 387, 208, 18, 55/20, 28, 31, 33, 161-163, 179, 180, 267-269

[56] References Cited

U.S. PATENT DOCUMENTS

| | | | |
|---|---|---|---|
| 2,494,644 | 1/1950 | Clement | 55/33 |
| 2,747,681 | 5/1956 | Schuftan et al. | 55/33 X |
| 3,221,476 | 12/1965 | Meyer | 55/28 |
| 3,359,706 | 12/1967 | Zankey | 55/20 |
| 3,594,984 | 7/1971 | Toyama et al. | 55/33 |
| 3,841,058 | 10/1974 | Templeman | 55/33 |
| 4,233,038 | 11/1980 | Tao | 55/33 |
| 4,249,915 | 2/1981 | Sircar et al. | 55/33 X |
| 4,685,938 | 8/1987 | Oliker | 55/20 |
| 4,711,645 | 12/1987 | Kumar | 55/33 X |
| 4,726,815 | 2/1988 | Hashimoto et al. | 55/33 X |
| 4,832,711 | 5/1989 | Christel, Jr. et al. | 55/20 |
| 4,941,894 | 7/1990 | Black | 55/20 |

FOREIGN PATENT DOCUMENTS

WO89/06218 7/1989 World Int. Prop. O.

*Primary Examiner*—Robert Spitzer
*Attorney, Agent, or Firm*—Armstrong, Westerman, Hattori, McLeland & Naughton

[57] ABSTRACT

A carbonate spring bath system includes a supplying device of a $CO_2$ gas, a dissolving device of the $CO_2$ gas into a bath water, and a bathtub. The supplying device of the $CO_2$ gas comprises a combustor for obtaining a combustion gas including the $CO_2$ gas, a $CO_2$ adsorption tower connected to the combustor through a gas feed line and connected to the dissolving device through a supply line, a cooler for cooling the combustion gas prior to being fed to the $CO_2$ adsorption tower and a heater for heating an adsorbent filled in the $CO_2$ adsorption tower for desorbing the $CO_2$ gas therefrom. The adsorbent capable of adsorbing the $CO_2$ gas from the combustion gas at a relatively low adsorption temperature and of desorbing the $CO_2$ gas therefrom at a relatively high desorption temperature. As the $CO_2$ gas in the combustion gas is adsorbed in the $CO_2$ adsorption tower in accordance with a thermal swing adsorption method, the $CO_2$ adsorption tower heated at the desorption temperature for desorbing the $CO_2$ gas therefrom must be cooled prior to adsorbing the $CO_2$ gas therein again. The supplying device is controlled so as to form a closed loop which is defined by a portion of the gas feed line and a cooling line extending from the $CO_2$ adsorption tower and terminating in the gas feed line upstream of the $CO_2$ adsorption tower. The adsorbent is cooled by a residual gas circulating in the closed loop. The residual gas is cooled by the cooler.

22 Claims, 9 Drawing Sheets

DEVICE OF SUPPLYING A CONCENTRATED $CO_2$ GAS IN A CARBONATE SPRING BATH SYSTEM

BACKGROUND OF THE INVENTION

1. Field of the Invention

The present invention is directed to a device of supplying a concentrated $CO_2$ gas in a carbonate spring bath system which is capable of cooling, at an improved cooling rate, a $CO_2$ gas adsorption tower for supplying the concentrated $CO_2$ gas.

2. Description of the Prior Art

When a bath water including a $CO_2$ gas is used in a bath, it is known that blood circulation in human a body is improved by taking the bath and fatigue is relieved. Japanese Patent Early Publication [KOKAI] No. 3-131259 describes a carbonate spring bath system, as illustrated below. Such bath system includes a combustor for supplying a combustion gas carrying the $CO_2$ gas, a $CO_2$ gas adsorption tower and a vacuum pump for desorbing a concentrated $CO_2$ gas from the adsorption tower and sending it to a bathtub. Stream included in the combustion gas is removed by a dehumidifier prior to sending the combustion gas to the $CO_2$ adsorption tower. However, as a desorption amount of the $CO_2$ gas is controlled by the vacuum pump, it is difficult to stably supply the concentrated $CO_2$ gas to the bathtub. On the other hand, the Japanese Patent Early Publication [KOKAI] NO. 3-131259 also describes another carbonate spring bath system, as illustrated below. That is, such bath system includes the combustor, a pair of steam adsorption towers for adsorbing the steam from the combustion gas and a separation film for separating the $CO_2$ gas from the combustion gas. The steam adsorption towers are arranged between the combustor and the separation film. As the steam adsorption towers is used alternately to adsorb the steam, the bath system is effectively operated. However, because the $CO_2$ gas is not stored in the separation film, it is difficult to increase a concentration of the $CO_2$ gas. Moreover, as a plurality of air pumps and the adsorption tower are used in the bath system, the bath system becomes an expensive system having a complex structure.

SUMMARY OF THE INVENTION

The above problems and insufficiencies have been overcome in the present invention by supplying a concentrated $CO_2$ gas in a carbonate spring bath system which is capable of cooling, at an improved cooling rate, a $CO_2$ gas adsorption tower for supplying the concentrated $CO_2$ gas, so that the bath system can be stably and repeatedly operated within a short interval. The carbonate spring bath system essentially consists of a device for supplying the concentrated $CO_2$ gas, a device for dissolving the $CO_2$ gas into a bath water and a bathtub. The device for supplying the concentrated $CO_2$ gas comprises a combustor for obtaining combustion gas containing $CO_2$ gas from a hydrocarbon fuel, a cooler the combustion gas, a $CO_2$ adsorption tower connected to the combustor through a gas feed line for receiving the combustion gas and connected to the dissolving device through a supply line. The $CO_2$ adsorption tower is filled with an adsorbent capable of adsorbing the $CO_2$ gas from the combustion gas at a relatively low adsorption temperature. The adsorbent also is capable of desorbing the $CO_2$ gas from the $CO_2$ adsorption tower at a relatively high desorption temperature for feeding the $CO_2$ gas to the dissolving device through the supply line. The cooler is disposed in the gas feed line between the combustor and the $CO_2$ gas adsorption tower. When the combustion gas is cooled in the cooler prior to being fed to the $CO_2$ adsorption tower, the $CO_2$ gas in the combustion gas is efficiently adsorbed to the adsorbent in the $CO_2$ adsorption tower. The supplying device also has a gas discharge line extending from the $CO_2$ adsorption tower in communication with the gas feed line. After the $CO_2$ gas in the combustion gas was adsorbed in the adsorbent, the combustion gas is exhausted to an outside through the gas discharge line. A heater is disposed within the $CO_2$ gas adsorption tower. When the adsorbent is heated above the desorption temperature by the heater, the concentrated $CO_2$ gas is desorbed from the $CO_2$ gas adsorption tower. As the $CO_2$ gas is adsorbed at the low adsorption temperature within the adsorbent, the $CO_2$ adsorption tower must be cooled to adsorb the $CO_2$ gas again after the concentrated $CO_2$ gas was desorbed at the high desorption temperature from the $CO_2$ adsorption tower. It is considered that the $CO_2$ gas adsorption tower is efficiently cooled by feeding an outside air therein. This, is not desired because a large amount of the outside air including the $CO_2$ gas is adsorbed in the adsorbent, so that an adsorption efficiency of the $CO_2$ gas into the adsorbent is lowered. Therefore, the supplying device of the present invention also has a cooling line extending from the $CO_2$ gas adsorption tower and terminating in the gas feed line upstream of the $CO_2$ adsorption tower so as to be cooperative with the gas feed line to form a closed loop for circulating a residual gas through the $CO_2$ adsorption tower, so that the adsorbent in the $CO_2$ adsorption tower is cooled at the improved cooling rate by the residual gas without adsorbing the large amount of the outside air. The residual gas is cooled by the cooler.

Accordingly, it is a primary object of the present invention to provide a device of supplying a concentrated $CO_2$ gas in a carbonate spring bath system which is capable of cooling, at an improved cooling rate, a $CO_2$ gas adsorption tower for supplying the concentrated $CO_2$ gas.

It is also preferred that a steam adsorption tower is included in the supplying device of the present invention. The steam adsorption tower is filled with a steam adsorbent capable of adsorbing steam carried in the combustion gas at a relatively low steam adsorption temperature. The steam adsorbent also is capable of desorbing the steam at a relatively high steam adsorption. The steam adsorption tower is disposed in the gas feed line upstream of the $CO_2$ gas adsorption tower for adsorbing the steam prior to the adsorption of the $CO_2$ gas at the $CO_2$ gas adsorption tower. As the steam adsorption tower is also arranged in the closed loop, both of the steam and the $CO_2$ gas adsorption towers can be simultaneously cooled by the residual gas circulating in the closed loop.

The desorption of the concentrated $CO_2$ gas from the $CO_2$ adsorption tower is expedited by feeding the outside air into the $CO_2$ gas adsorption tower during the time period of desorbing the $CO_2$ gas. As the $CO_2$ gas adsorption tower is kept at the high desorption temperature, the outside air can be hardly adsorbed in the adsorbent in the $CO_2$ gas adsorption tower. The outside air is introduced to the $CO_2$ adsorption tower by an air pump. On the other hand, a desorption amount of the steam is expedited by feeding the outside air into the steam adsorption tower during the time period of desorbing the steam. Therefore, when the steam is desorbed from the steam adsorption tower at the high steam desorption temperature, the air pump is also used for introducing the outside air to the steam adsorption tower.

Therefore, it is a another object of the present invention to provide a device of supplying a concentrated $CO_2$ gas in a carbonate spring bath system which is capable of efficiently using a component part of the device such as an air pump, so that the device having a simple structure is supplied at a moderate price.

For more complete understanding of the present invention and its construction and advantages, reference should be made to the following description and to the drawings.

DESCRIPTION OF THE PREFERRED EMBODIMENT

Figure 1:
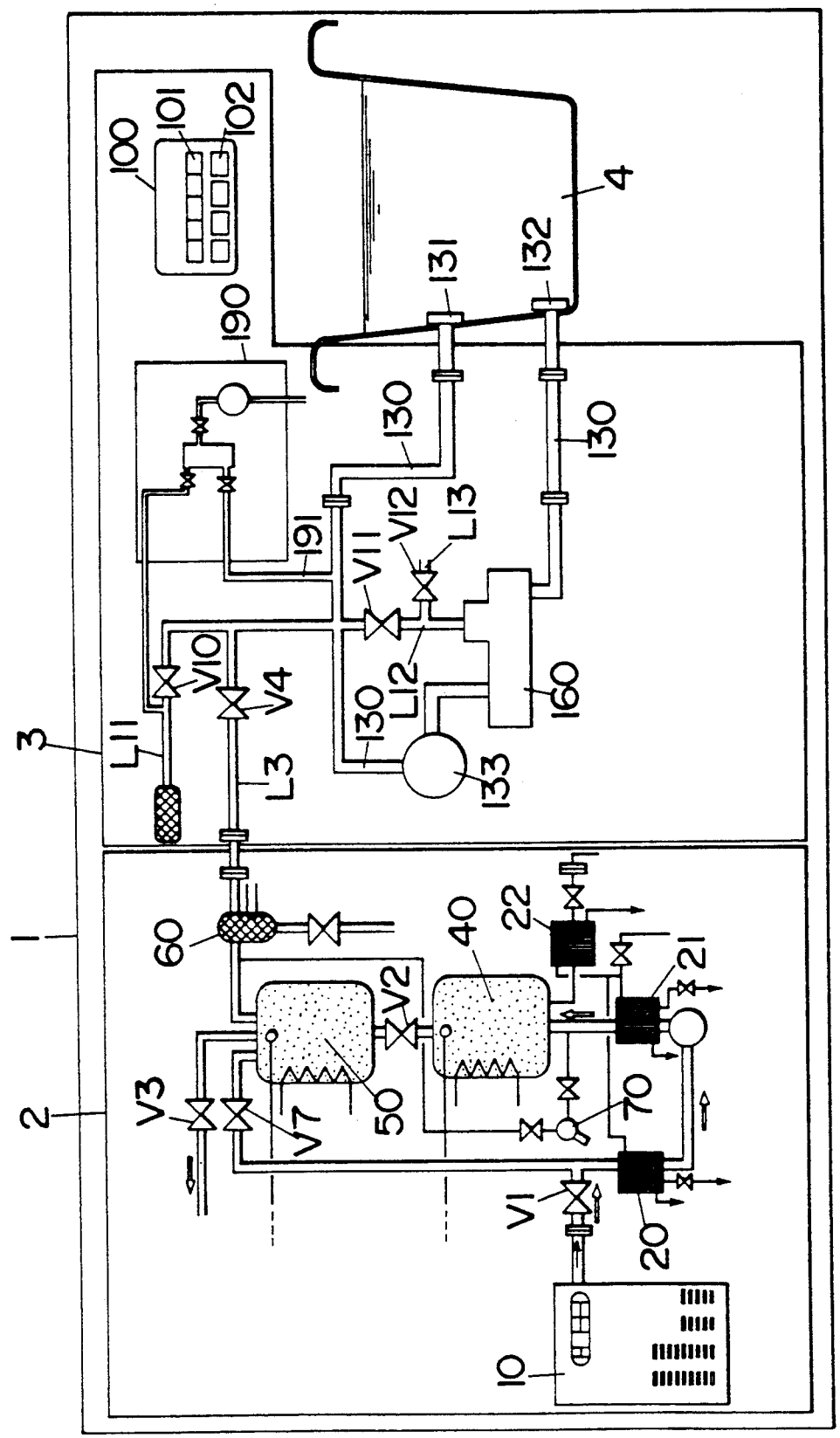
FIG. 1 is a schematic diagram of a carbonate spring bath system used in the described embodiment of the present invention.

A carbonate spring bath system 1 essentially consists of a supplying device 2 of a $CO_2$ gas of the present invention, a dissolving device 3 of the $CO_2$ gas into a bath water and a bathtub 4, as illustrated in FIG. 1. The supplying device 2 of the present invention comprises a combustor 10 for obtaining a combustion gas including the $CO_2$ gas from a hydrocarbon fuel, a $CO_2$ adsorption tower 50 for adsorbing the $CO_2$ gas from the combustion gas and desorbing the $CO_2$ gas therefrom, a steam adsorption tower 40 for adsorbing the steam included in the combustion gas prior to being fed to the $CO_2$ adsorption tower 50, heat exchangers 20 and 21 for cooling the combustion gas prior to being fed to the steam adsorption tower 40 and a toxic gas remover 60 for removing a small amount of toxic gas included in the $CO_2$ gas desorbed from the $CO_2$ adsorption tower 50. The supplying device of the present invention is ordinary operated in the following order, that is, 1) A $CO_2$ gas adsorption process to the $CO_2$ adsorption tower 50

2) A $CO_2$ gas desorption process from the $CO_2$ adsorption tower 50

3) A steam desorption process from the steam adsorption tower 40

4) A cooling process of the $CO_2$ gas adsorption tower 50

5) A toxic gas desorption process from the toxic gas remover 60 (*1)

*1: The toxic gas desorption process is performed at an optimum time as necessary.

1) The $CO_2$ gas adsorption process to the $CO_2$ adsorption tower

Figure 2:
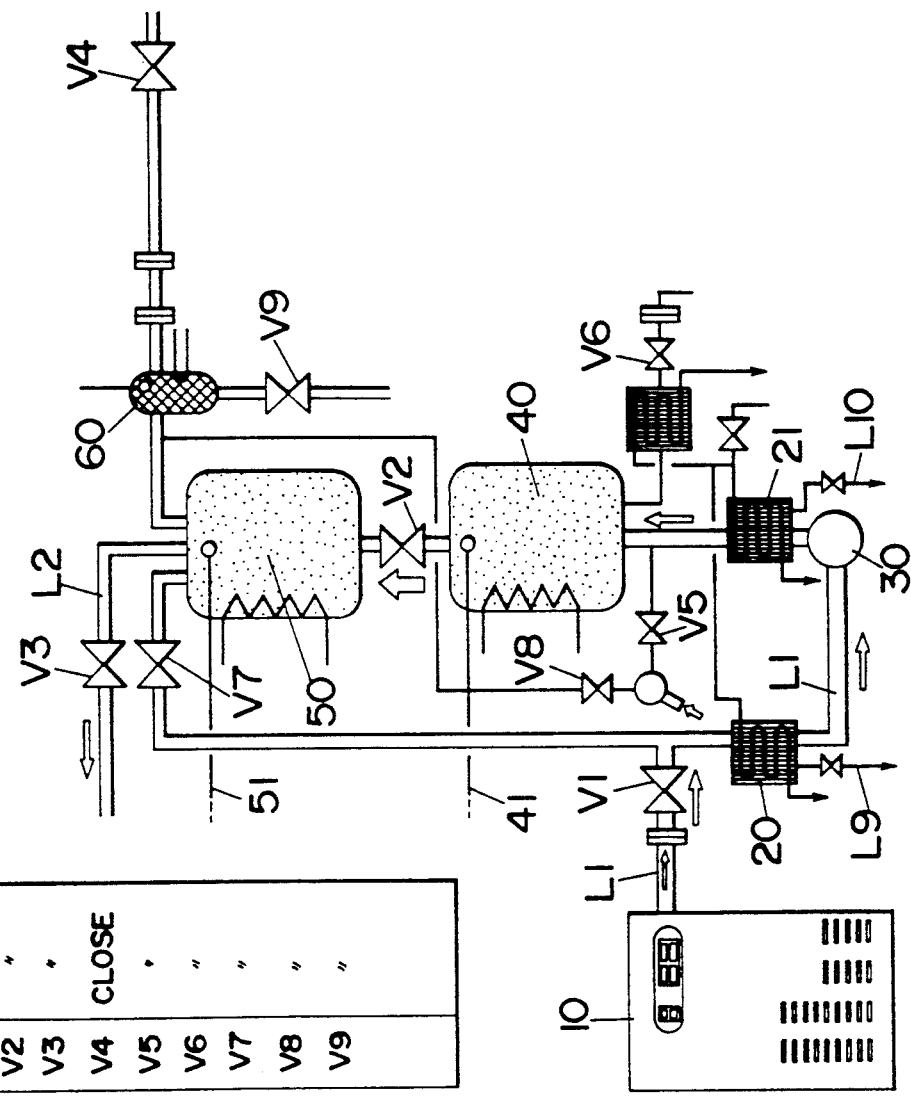
FIG. 2 is a schematic diagram showing a $CO_2$ gas adsorption process to a $CO_2$ adsorption tower of a device of supplying a concentrated $CO_2$ gas in the carbonate spring bath system in accordance with the present invention.

A schematic diagram of the supplying device 2 of the present invention in case of performing the $CO_2$ gas adsorption process is illustrated in FIG. 2. A natural gas as the hydrocarbon fuel is burned at the combustor 10. The combustion gas supplied from the combustor 10 contains the $CO_2$ gas of about 5%, the steam, nitrogen, oxygen and the small amount of toxic gas such as NOx and CO. A gas feed line L1 extends from the combustor 10 to the $CO_2$ gas adsorption tower 50 through the steam adsorption tower 40, as shown in FIG. 2. A valve V1, which is arranged in the gas feed line L1 between the combustor 10 and the heat exchanger 20, is opened to send the combustion gas from the combustor 10 to the $CO_2$ gas adsorption tower 50 through the steam adsorption tower 40. As the combustion gas with a high temperature which is about 150° C. is fed from the combustor 10, the combustion gas is cooled to about 50° C. at the heat exchanger 20, which is arranged in the gas feed line L1, prior to feeding to the steam adsorption tower 40. Subsequently, the combustion gas is fed to a blower 30 arranged in the gas feed line L1 between the heat exchangers 20 and 21. The combustion gas is fed, by the blower 30, to the heat exchanger 21 which is arranged in the gas feed line L1 between the blower 30 and the steam adsorption tower 40. As the combustion gas is pressurized in the blower 30, so that the combustion gas is heated to about 80° C., the combustion gas is cooled again to about 50° C. at the heat exchanger 21. Each heat exchanger is water cooling type. Water drops attaching to the inside of a gas pipe of the gas feed line L1 passing in the heat exchangers 20 and 21 formed with a condensation of the steam in the combustion gas, are discharged to an outside through water discharging lines L9 and L10, respectively. A vibration caused by the blower 30 is transmitted to the heat exchanger 21 through the gas pipe of the gas feed line L1, so that a cooling effect of the heat exchanger 21 is enhanced. As the steam included in the combustion gas is adsorbed within the steam adsorption tower 40 in accordance with a temperature swing adsorption method, the combustion gas is cooled to a lower temperature by the heat exchanger 21 prior to feeding to the steam gas adsorption tower 40. The steam in the combustion gas is adsorbed within an activated alumina of an adsorbent which is filled in the steam adsorption tower. A weight of the activated alumina is about 10 kg. On the other hand, as a zeolite used for an adsorbent of the $CO_2$ gas which is filled in the $CO_2$ gas adsorption tower 50 has a higher adsorption of the steam compared with the $CO_2$ gas, the steam in the combustion gas must be mostly, and more preferably perfectly, removed within the steam adsorption tower 40 prior to sending to the $CO_2$ gas adsorption tower 50. If not so, the higher adsorption efficiency of $CO_2$ gas within the zeolite will be not desired. Therefore, a humidity sensor (not shown) is arranged in the gas feed line L1 between the both adsorption towers 40 and 50 in order to monitor a steam amount carried in the combustion gas. When the monitored humidity exceeds a critical level, the combustion gas is controlled so as not to feed to the steam adsorption tower 40. A thermo sensor 41 is arranged in the steam adsorption tower 40 to monitor a temperature of the activated alumina. A flow amount of the combustion gas is controlled based on a known relation between the monitored temperature and steam adsorption capacity of the activated alumina. When the combustion gas without the steam is sent to the $CO_2$ adsorption tower 50, a valve V2, which is positioned in the gas feed line L1 between the adsorption towers 40 and 50, is opened. The combustion gas is sent to the $CO_2$ gas adsorption tower 50 for about 12 min. Consequently, the $CO_2$ gas concentrated to about 90 vol % and the balance such as nitrogen and oxygen, etc., of about 10 vol % are adsorbed within the zeolite of the $CO_2$ gas adsorption tower 50. However, the $CO_2$ adsorption tower is capable of adsorbing nearly 100 vol % of the $CO_2$ gas under an optimum condition. A weight of the zeolite used in the $CO_2$ gas adsorption tower 50 is about 8 kg. When the combustion gas is discharged to the outside after the $CO_2$ gas was adsorbed in the $CO_2$ gas adsorption tower 50, a valve V3, which is arranged in a gas discharge line L2 extending between the outside and the $CO_2$ gas adsorption tower 50, is opened.

2) The $CO_2$ gas desorption process from the $CO_2$ adsorption tower

Figure 3:
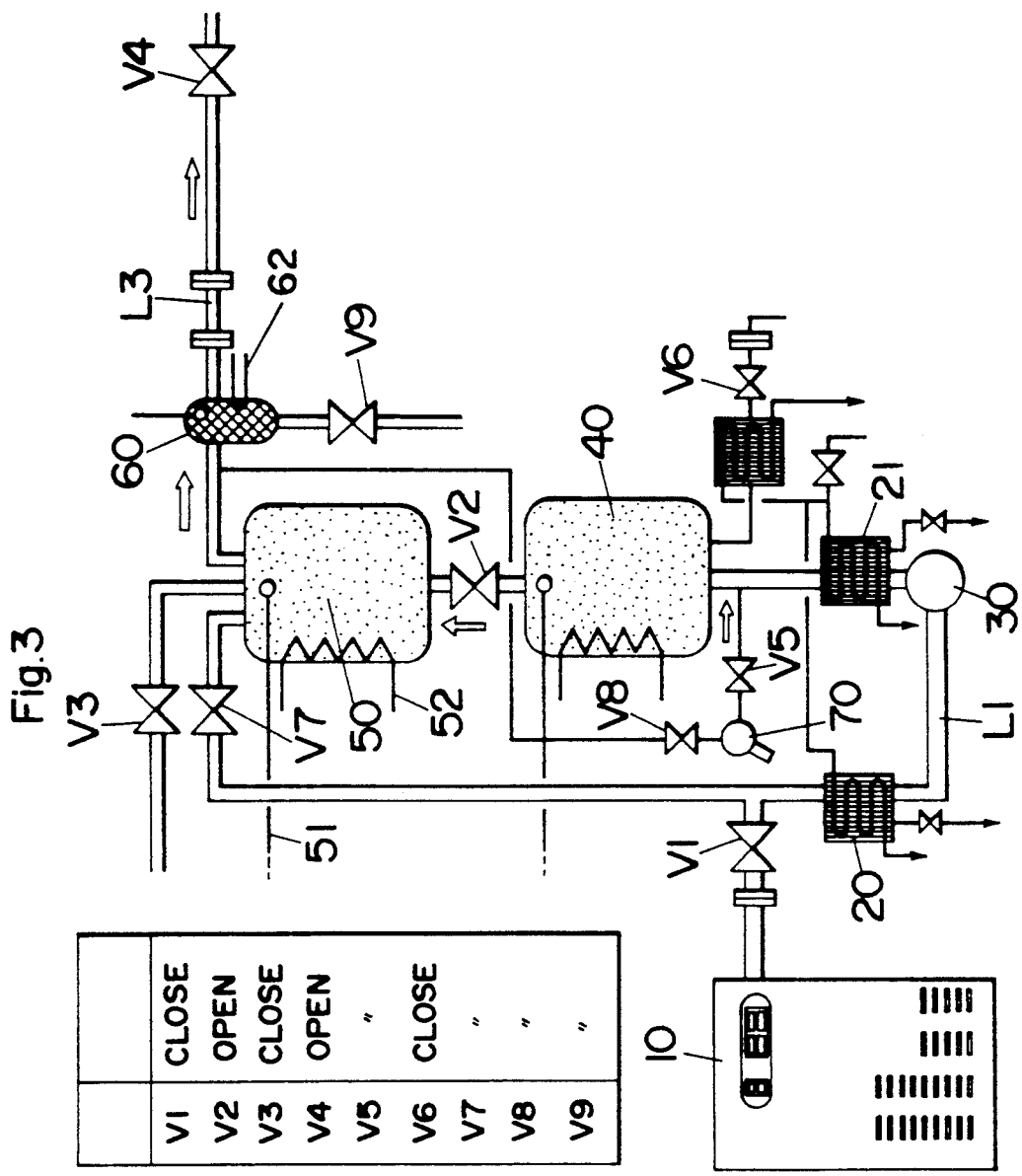
FIG. 3 is a schematic diagram showing a $CO_2$ gas desorption process from the $CO_2$ adsorption tower of the device of supplying the $CO_2$ gas according to the present invention.
Figure 4:
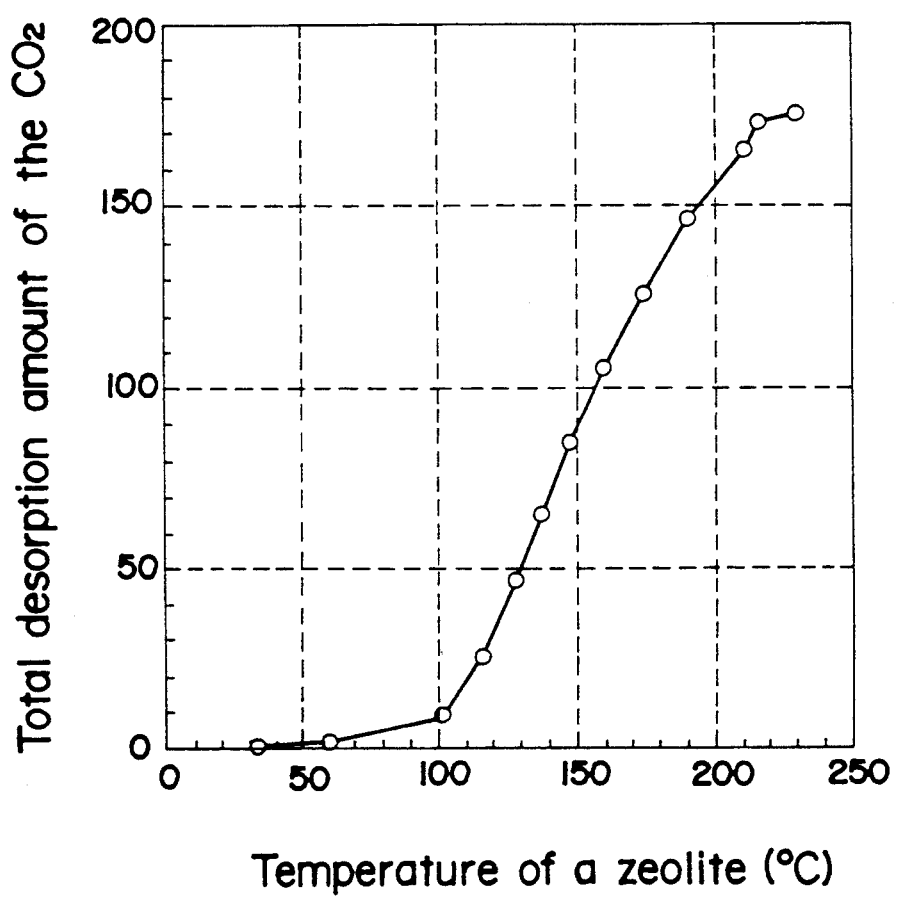
FIG. 4 is a relation between a total desorption amount of the $CO_2$ gas from a zeolite used in the embodiment and a temperature of the zeolite.

A schematic diagram of the supplying device 2 of the present invention in case of performing the $CO_2$ gas desorption process is illustrated in FIG. 3. The zeolite is heated at a $CO_2$ desorption temperature between 150° C. and 300° C. by a heater 52 which is disposed in the $CO_2$ adsorption tower 50 in order to desorb the $CO_2$ gas from the $CO_2$ adsorption tower. The heater 52 has a plurality of circular heaters arranged in a concentric relation within the $CO_2$ adsorption tower 50. More details about the heater 52 are described later. The zeolite in the $CO_2$ adsorption tower 50 is heated to a temperature below the $CO_2$ desorption temperature for an optimum time period prior to desorbing the $CO_2$ gas therefrom, so that the $CO_2$ gas is efficiently desorbed from the zeolite as soon as starting the desorption of the $CO_2$ gas. And besides, an outside air is sent to the $CO_2$ gas adsorption tower 50 through the steam adsorption tower 40 by an air pump 70 in order to expedite the desorption of the $CO_2$ gas. A temperature of the zeolite is detected by a thermo sensor 51 disposed to an optimum position in the $CO_2$ adsorption tower 50. A relation between a total desorption amount of the $CO_2$ gas from the zeolite and the temperature of the zeolite is illustrated in FIG. 4. As the temperature of the zeolite is higher, the desorption amount of the $CO_2$ gas increases. Therefore the desorption amount of the $CO_2$ gas can be regulated by controlling the temperature of the zeolite. It is not concerned with respect to the present invention that the desorption amount of the $CO_2$ gas is controlled by a flow meter (not shown) disposed downstream of the $CO_2$ adsorption tower 50. The desorption of the $CO_2$ gas is performed for about 1 hour. When the $CO_2$ gas desorbed from the $CO_2$ adsorption tower 50 is sent to the dissolving device 3 through the toxic gas remover 60, a valve V4, which is arranged in a gas supply line L3 extending between the dissolving device 3 and the $CO_2$ adsorption tower 50, as shown in FIG. 3, is opened. Needless to say, the valve V3 is closed. A constrictor (not shown) is arranged in the supply line L3 to supply a stable flow amount of the $CO_2$ gas to the dissolving device 3. As the small amount of the toxic gas such as the NOx gas and the CO gas is contained in the $CO_2$ gas desorbed from the $CO_2$ gas adsorption tower 50, the toxic gas is adsorbed and removed from the $CO_2$ gas at the remover 60. A $\gamma$-alumina carrying a platina is filled in the remover 60 to remove the toxic gas. The NOx gas is adsorbed within the remover 60, on the other hand, the CO gas is changed to the $CO_2$ gas within the remover. The remover 60 is heated at a temperature of between 230° C. and 330° C. by a heater 62 which is disposed in the remover to remove the toxic gas. The $CO_2$ gas and the bath water are mixed under a pressurized condition in the dissolving device 3, and then sent to the bathtub 4. More details about the dissolving device 3 are described later.

3) The steam desorption process from the steam adsorption tower 40

Figure 5:
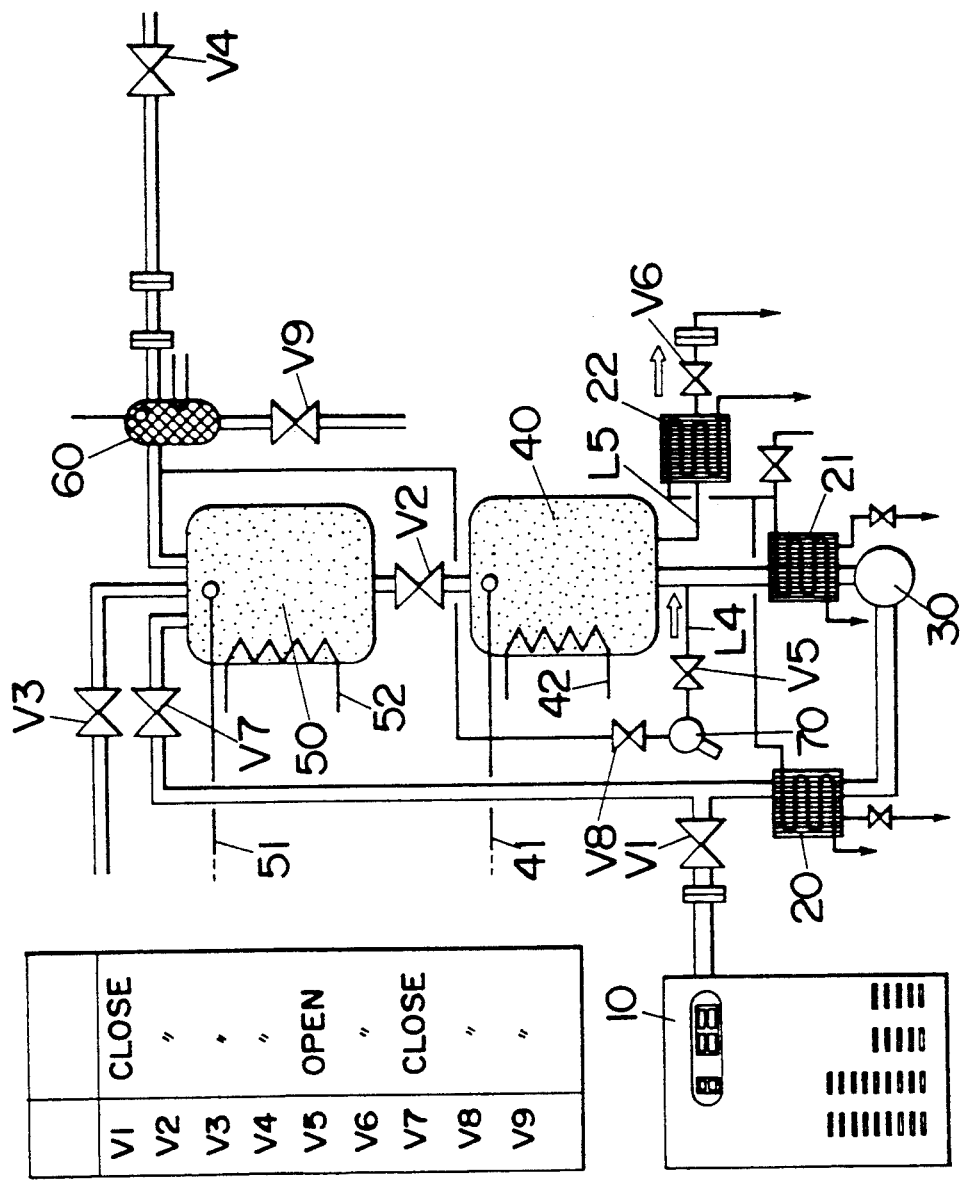
FIG. 5 is a schematic diagram showing a steam desorption process from a steam adsorption tower of the device of supplying the $CO_2$ gas according to the present invention.

A schematic diagram of the supplying device 2 of the $CO_2$ gas of the present invention in case of performing the steam desorption process is illustrated in FIG. 5. The steam adsorbed in the steam adsorption tower 40 must be desorbed and removed therefrom prior to preforming the $CO_2$ gas adsorption process again. The activated alumina is heated at a steam desorption temperature between 150° C. and 250° C. by a heater 42, which is disposed in the steam adsorption tower 40, in order to desorb the steam therefrom. The outside air is also fed to the steam adsorption tower 40 to expedite the desorption of the steam. A valve V5, which is arranged in an air feed line L4 extending between the air pump 70 and the steam adsorption tower 40, is opened to feed the outside air to the steam adsorption tower 40. For discharging the outside air including the steam from the steam adsorption tower 40 to the outside, a valve V6, which is arranged in an air discharge line L5 extending between the steam adsorption tower 40 and the outside, as shown in FIG. 5, is opened. The outside air including the steam is cooled by heat exchanger 22 which is also arranged in the discharge line L5. The steam desorption temperature from the steam adsorption tower 40 and a flow amount of the outside air into the steam adsorption tower 40 may be controlled based on the humidity monitored by the humidity sensor. The steam desorption process is ordinary performed for about 1.5 hours. In this process, the valve V2 is closed so as not to feed the outside air including the steam to the $CO_2$ adsorption tower 50. As the steam desorption process and the $CO_2$ gas desorption process need rather great electric powers of as much as 1 kw, respectively, it is desired that the steam desorption process is sequentially performed after the $CO_2$ gas desorption process was finished for avoiding over-current condition.

4) The cooling process of the $CO_2$ ga adsorption tower 50

Figure 6:
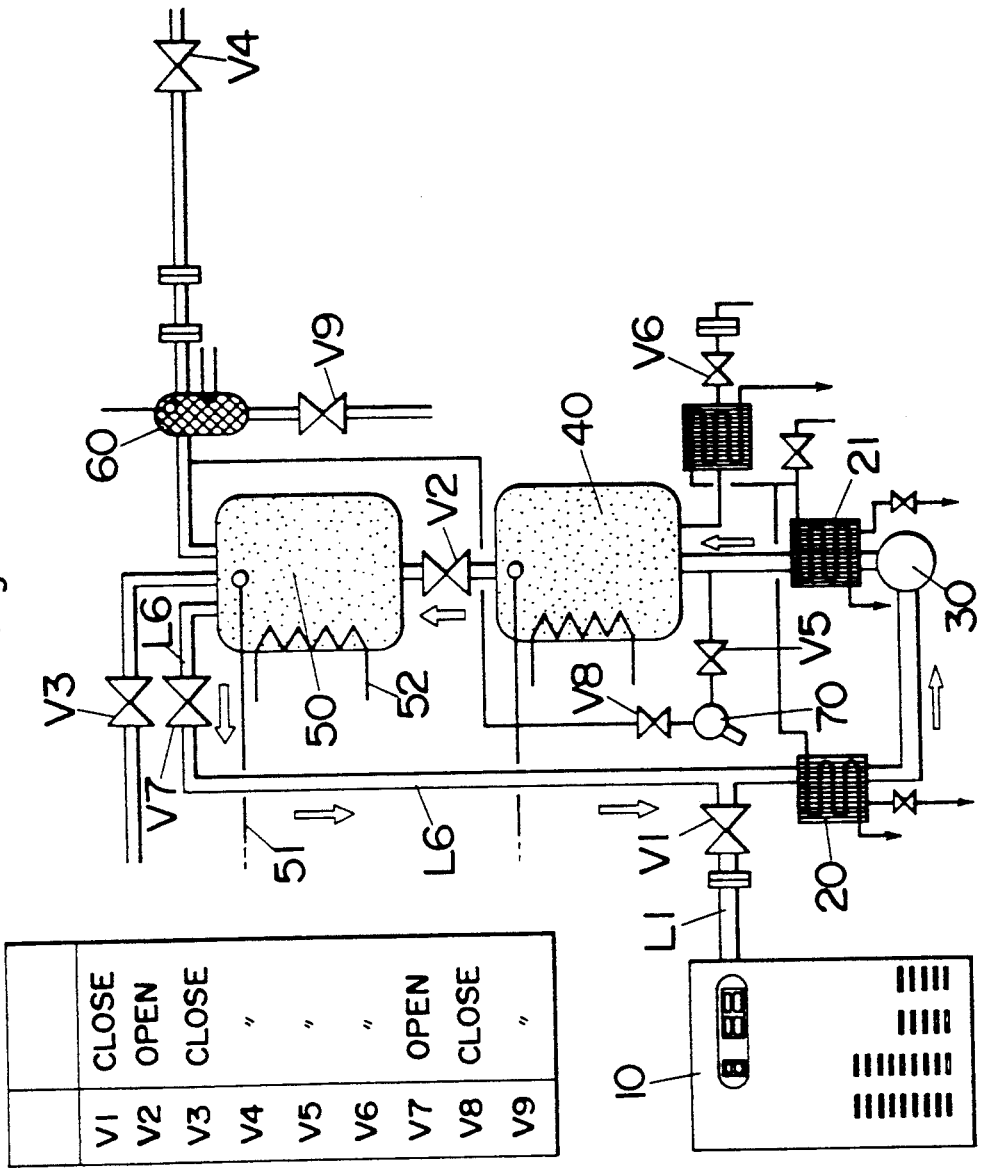
FIG. 6 is a schematic diagram showing a cooling process of the $CO_2$ gas and the steam adsorption towers of the device of supplying the $CO_2$ gas according to the present invention.

A schematic diagram of the supplying device 2 of the $CO_2$ gas of the present invention in case of performing the cooling process is illustrated in FIG. 6. After the $CO_2$ gas desorption process and the steam desorption process are finished, the cooling process of the $CO_2$ gas adsorption tower 50 is performed. As the zeolite is heated to the $CO_2$ desorption temperature between 150° C. and 300° C. during the $CO_2$ gas desorption process, it is so difficult to adsorb the $CO_2$ gas in the zeolite immediately after the $CO_2$ desorption process was finished. Therefore, the zeolite must be cooled to a $CO_2$ adsorption temperature less than about 50° C. so as to easily adsorb the $CO_2$ therein. As shown in FIG. 6, the $CO_2$ adsorption tower 50 is cooled by circulating a residual gas in a closed loop which is defined by a portion of the gas feed line L1 and a cooling line L6 extending from the $CO_2$ adsorption tower 50 and terminating in the gas feed line L1 upstream of the $CO_2$ adsorption tower and also of the heat exchanger 20. That is, the closed loop includes the heat exchangers 20 and 21 which are responsible for cooling the residual gas circulating through the $CO_2$ adsorption tower. A valve V7, which is arranged in the cooling line L6, is opened to form the closed loop. As the valve V1 is connected between the closed loop and the combustor 10, the valve V1 is closed to separate the closed loop from the combustor 10. The valve V2 is opened and all of the valves in the supplying device 2, except for the valves V2 and V7, are closed to form the closed loop. The activated alumina of the steam adsorption tower 40 is simultaneously cooled to a steam adsorption temperature less than about 50° C. by the residual gas in order to efficiently adsorb the steam after the steam desorption process was completed. When the cooling process of the present invention is performed, it only takes a few hours to cool the $CO_2$ adsorption tower 50 to the $CO_2$ adsorption temperature less than about 50° C. If the above forced cooling process should not be performed and, instead, the $CO_2$ gas adsorption tower 50 should be left for natural cooling, it takes over 24 hours to cool the $CO_2$ gas adsorption tower 50 down to about 50° C. sufficient to be ready for subsequent adsorption of $CO_2$ gas. Although the outside air might be introduced through the $CO_2$ gas adsorption tower 50 for forced cooling thereof by flowing a large amount of the outside air, such introduction of the outside air in a large amount should be avoided because of the fact that the steam inherently contained in the outside air will soon saturate the steam adsorption tower 40 and be subsequently adsorbed into the $CO_2$ gas adsorption tower 50 to eventually lower the $CO_2$ adsorption capability. This is particularly true when the cooling of the $CO_2$ gas adsorption tower 50 is made soon after heating the steam adsorption tower 40 for regeneration thereof, i.e., the steam adsorption tower 40 is kept still at such a high temperature that substantial adsorption of the steam is not expected. Therefore, the $CO_2$ gas adsorption tower 50 should be cooled in the absence of the outside air.

5) The toxic gas desorption process from the toxic gas remover 60

Figure 7:
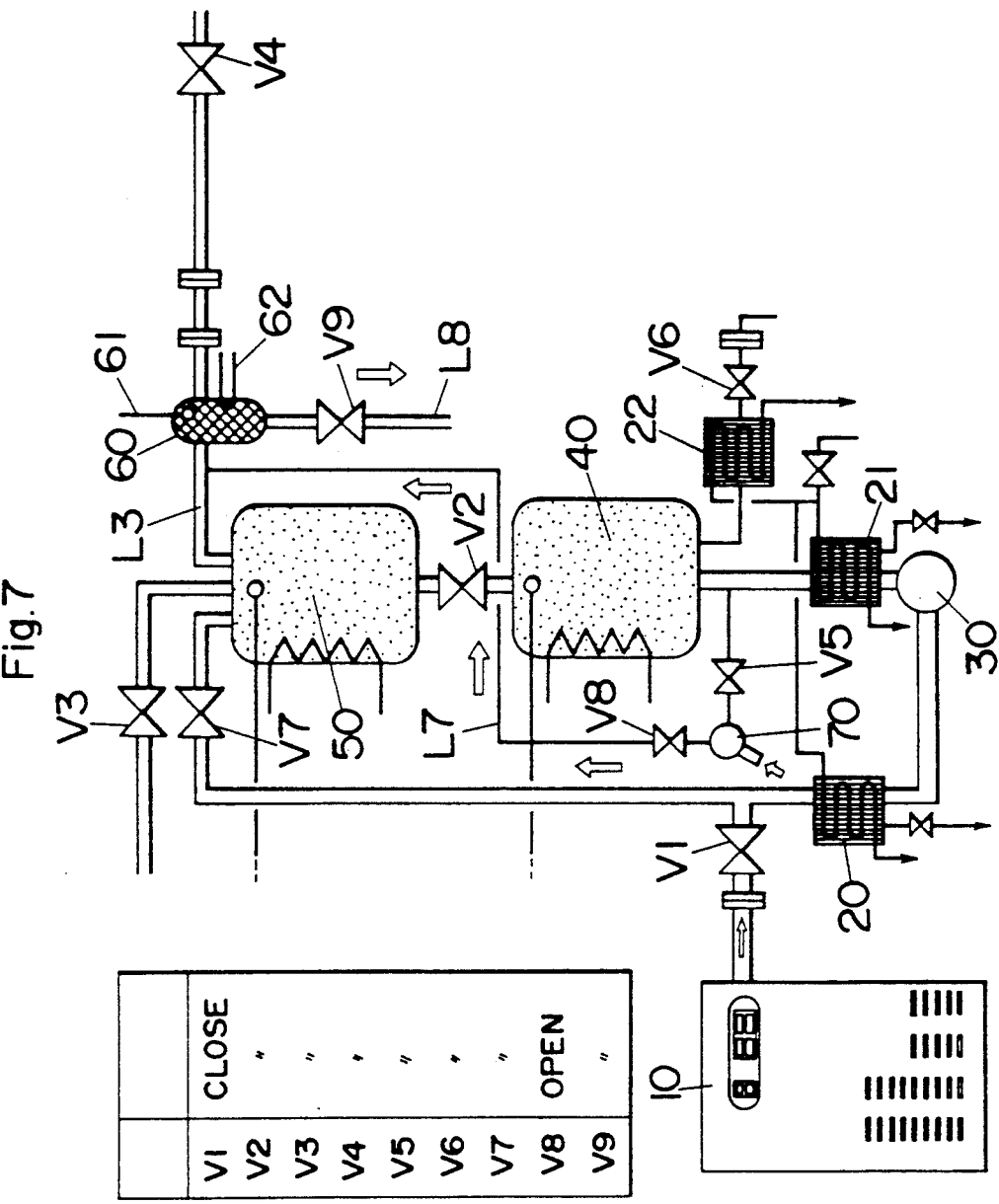
FIG. 7 is a schematic diagram showing a desorption process of a toxic gas from a toxic gas remover of the device of supplying the $CO_2$ gas according to the present invention.

As described above, the desorption process of the toxic gas such as the NOx gas and the CO gas from the remover 60 is performed at the optimum time, as necessary. A schematic diagram of the supplying device 2 of the $CO_2$ gas of the present invention in case of performing the toxic gas desorption process is illustrated in FIG. 7. The γ-alumina carrying the platina is heated at a temperature between 500° C. and 600° C. by the heater 62 to remove the toxic gas from the remover 60. A temperature of the γ-alumina carrying the platina is detected by a thermo sensor 61 which is disposed to an optimum position in the remover 60. The outside air is also sent to the remover 60 by the air pump 70 in order to expedite the desorption of the toxic gas from the remover 60. In this case, a valve V8, which is arranged in an air feed line L7 extending between the remover 60 and the air pump 70, is opened to feed the outside air thereto. Valve V9, arranged in an air discharging line L8 extending between the remover 60 and the outside, is opened to discharge the outside air containing the toxic gas to the outside. As the small amount of the toxic gas is included in the outside air discharged from the remover 60, there is no problem with respect to an environmental pollution. Because the valves V2, V3, and V7 are closed during the toxic gas desporption process, the outside air fed to the remover 60 is not sent to the $CO_2$ gas adsorption tower 50 through the supply line L3. The steam desorption process and the toxic gas desorption process each need rather great electric powers of as much as 1 kw, respectively. Therefore, it is preferred that the toxic gas desorption process is sequentially performed after the steam desorption process was finished for avoiding the over-current condition.

As described in the above processes, a component such as the air pump 70 or the blower 30, etc., of the supplying device 2 of the $CO_2$ gas in the spring bath system 1 is efficiently used to obtain a simple operation of the bath system 1 and to supply the bath system at a moderate price. For example, the air pump 70 is used for sending the outside air to the $CO_2$ gas adsorption tower 50 in the $CO_2$ gas desorption process, for sending the outside air to the steam adsorption tower 40 in the steam desorption process and also for sending the outside air to the toxic gas remover 60 in the toxic gas desorption process. In the embodiment of the present invention, all of the valves, the heaters, the air pump, the thermo sensor and the humidity sensor, etc., are controlled so as to perform the individual optimum operation in each process by a main controller (not shown).

Figure 8:
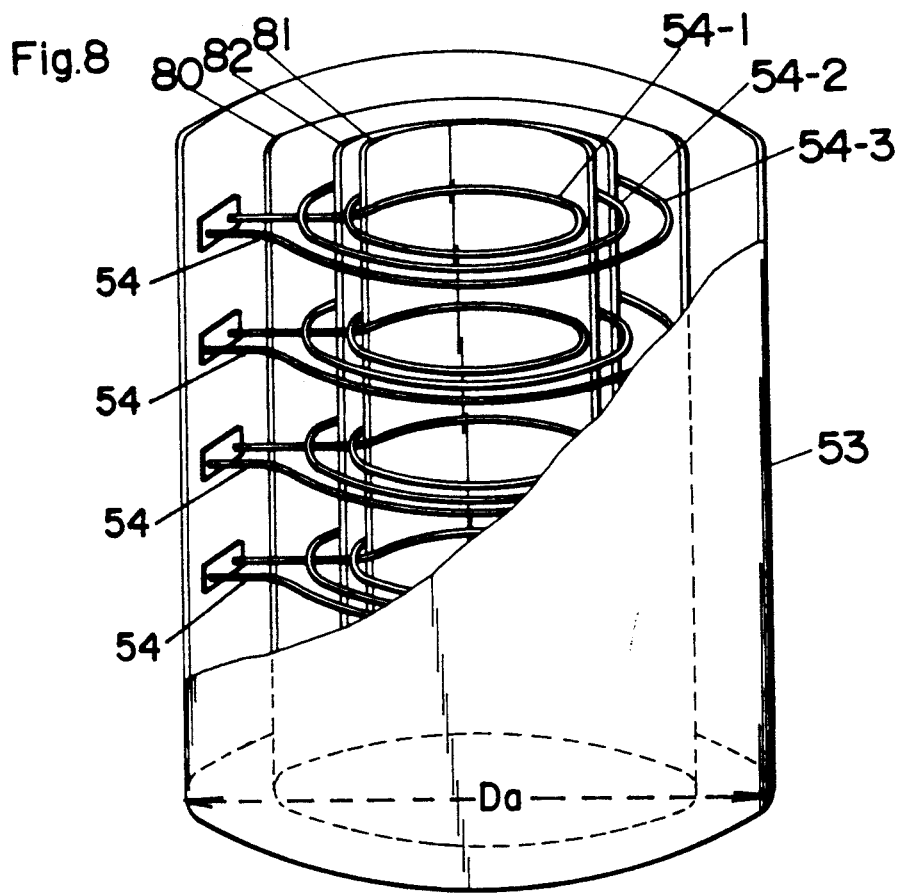
FIG. 8 is a perspective view, partially broken away, of an internal structure of the $CO_2$ adsorption tower with the zeolite removed therefrom.
Figures 9A, 9B:
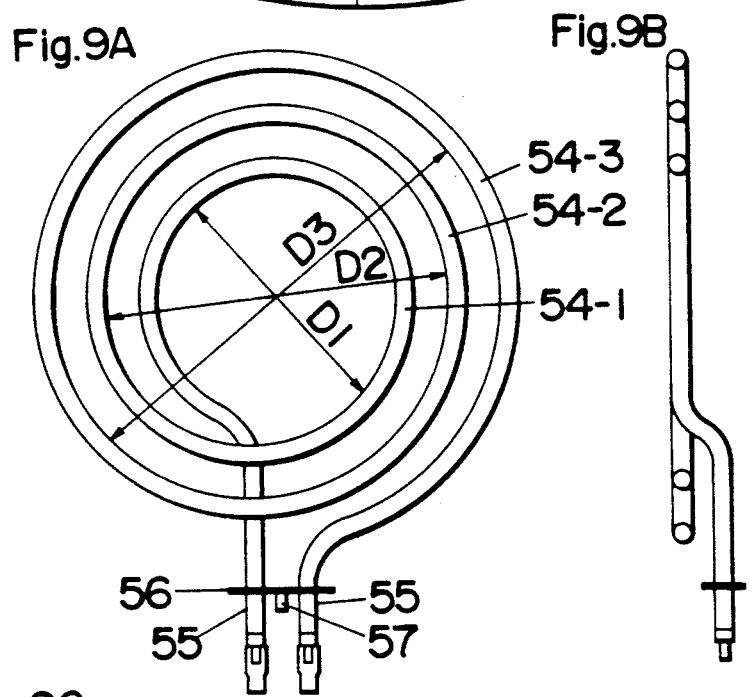
FIG. 9A, 9B and 9C are plan, side, and front views, respectively of a heating member mounted within the $CO_2$ adsorption tower.
Figure 9C:
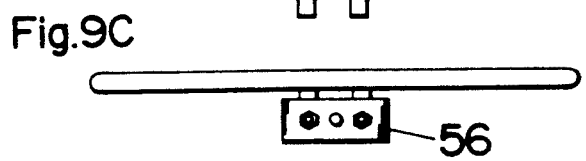
Figure 10:
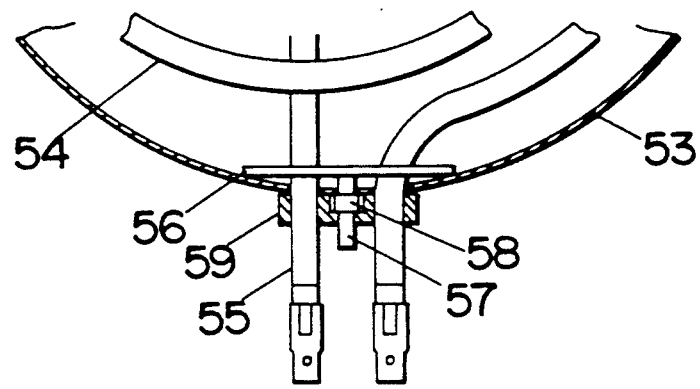
FIG. 10 is a partial plan view illustrating the mounting structure of the heating member to a cylinder of the $CO_2$ tower.

More details about the heater 52 used in the $CO_2$ adsorption tower are described below. FIG. 8 illustrates the interior of the $CO_2$ adsorption tower 50 in which the heater 52 is mounted. The $CO_2$ adsorption tower 50 comprises a cylinder 53 having a circular cross section perpendicular to the flow direction of the $CO_2$ gas being desorbed from the adsorbent. The adsorbent filling the cylinder constitutes a layer having a diameter Da corresponding to an inside diameter of the cylinder. The heater 52 comprises a plurality of separate heating members 54 spaced vertically within the cylinder 53 of the $CO_2$ adsorption tower 50. As shown in FIGS. 9A to 9C, each of the heating members 54 is composed of a single heating wire convoluted several turns to have substantially three concentric annuluses, i.e, an inner annulus 54-1, a middle annulus 54-2, and an outer annulus 54-3 having effective diameters D1, D2, and D3. The opposite ends of the heating wires are held in a close parallel relation and defines terminal ends 55 which are inserted through a flange 56 to be supported thereby. As shown in FIG. 10, thus constructed heating members 54 are mounted to the cylinder 53 with the flange 56 abutted against the interior wall of the cylinder 53 in such a manner as to project the terminal ends 55 through corresponding holes in the wall of the cylinder for connection to an electrical source (not shown). A bolt 57 extends from the flange 56 through a hole in the cylinder 53 for securing the flange 56 to the cylinder 53 with a nut 58 engaged with the bolt 57. A ring 59 is fitted on the exterior surface of the cylinder 53 to surround the terminal ends and is filled with a heat resistive adhesive for hermetically sealing the terminal ends 55 and the bolt 57. Such adhesive may includes a silicone adhesive, organic epoxy-or phenol- base adhesive, or the like heat resistive ones including a ceramic of alumina, magnesia or zirconia. Although not shown, the adhesive may be applied on the interior surface of the cylinder 53.

The outer annulus 54-3 is dimensioned to have a diameter D3 which is determined in relation to the diameter Da of the adsorbent layer in the cylinder and expressed by the following formula:

$$D3 \geq \sqrt{\frac{3}{4}} \, Da$$

This relation is found most effective to preferentially heat the outer region of the adsorbent layer at which relatively large latent heat is expected for desorption of the $CO_2$ gas therefrom and therefore to enhance the desorption of the $CO_2$ gas. In this connection, the other annuluses 54-1 and 54-2 is preferably dimensioned to have a diameter Di which is expressed by the following formula:

$$Di \geq \left( \sqrt{\frac{(2i-1)}{2N}} \right) Da$$

where i is an integer starting from 1, 2, ... N for identification of the annuluses in the radial order as counted radially outwardly from the innermost annulus, and N is a total number of the annuluses, in this instance, 3.

Figure 11:
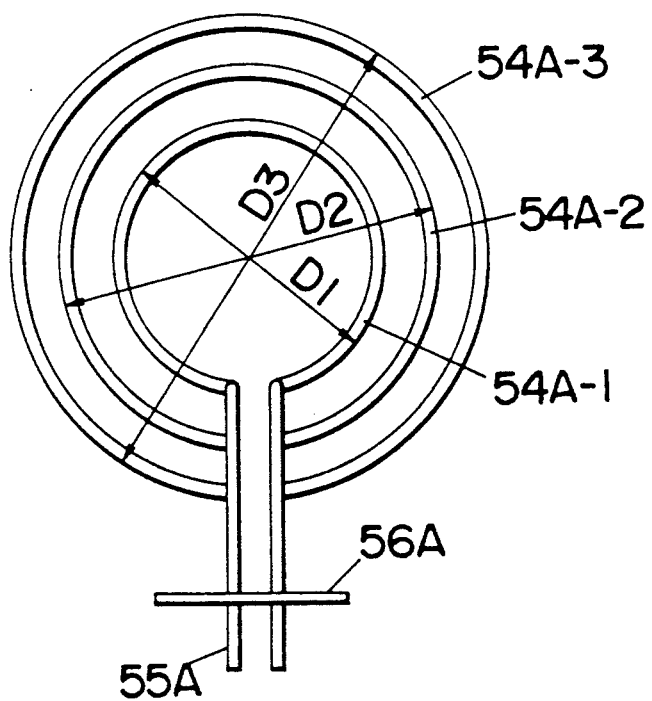
FIG. 11 is a plan view illustrating a modified heating member which may be utilized in the $CO_2$ adsorption tower.

Turning back to FIG. 8, the cylinder 53 may includes a heat conductive member so surrounding the outermost annulus 54-3 in heat transfer contact therewith. The member extends substantially full height or length of the cylinder 53 in order to expedite the heat transfer from the heating elements to the adsorbent in the flow direction of the gas, i.e, the vertical direction of the cylinder at the outer region of the adsorbent. Further, like heat conductive members S1 and S2 may be disposed between the adjacent ones of the annuluses 54-1, 54-2, and 54-3. Such heat conductive members are made of a stainless steel, copper, nickel, aluminum, brass, or even ceramics such as alumina and magnesia. It should be noted at this time that each of the heating member 54 is not necessarily made from the single convoluted wire as seen in the above, but may made from a combination of annular heating wires 54A-1, 54A-2, and 54A-3, as shown in FIG. 11. In this instance the three annular heating wires are commonly connected to terminal ends 55A which are supported by a like flange 56A.

The dissolving device 3 of the $CO_2$ gas into the bath water in the spring bath system 1 is described below. As shown in FIG. 1, the $CO_2$ dissolving device 3 comprises a circulation path 130 connected to the bathtub 4 at an inlet 131 and an outlet 132 for circulation of the bath water from and into the bathtub 4 through the inlet 131 and outlet 132. A booster pump 133 is provided in the circulation path 130 for driving to circulate the bath water as well as for dissolving the $CO_2$ gas and an air at a pressurized condition into the bath water circulating the path 130. The gas supply line L3 with the valve V4 extends from the $CO_2$ adsorption tower 50 and terminates in the circulation path 130 upstream of the booster pump 133 to supply the concentrated $CO_2$ gas, i.e., a mixture gas of $CO_2$ and the air to the bath water in the circulation path 130. Additionally connected to the circulation path 130 upstream of the booster pump 133 is an air supply line L11 for supplying the air to the bath water when operating to dissolve only the air to effect an air micro-bubbling bath. The air supply line L11 is provided with a valve V10 which is kept closed when dissolving the $CO_2$ gas into the bath water. The air supply line L11 may be opened when no substantial amount of the air is not expected to be supplied from the $CO_2$ adsorption tower 50, i.e., a very rich $CO_2$ gas is supplied therefrom. It should be noted in this connection that the carbonate bath system necessitates a certain amount of air, preferably at least 5 vol % of air along with the $CO_2$ gas in order to keep the $CO_2$ gas dissolved in the bathtub 4 over a prolonged time for enhanced spring bath effect. Although an exact mechanism is not known, it is empirically demonstrated that when a limited amount of the air is dissolved together with a large amount of the $CO_2$ gas into the bath water at a pressurized condition, the dissolved $CO_2$ gas is very reluctant to form large bubbles upon the bath water coming into the bathtub 4 through the outlet 132 as being depressurized. In other words, if no substantial amount of the air is not dissolved in the pressurized bath water, large bubbles of the $CO_2$ gas will appear when the bath water flows into the bathtub 4 as being depressurized. If this occur, the $CO_2$ gas rises quickly in the form of the large bubbles and fails to be dissolved in the bath water within the bathtub 4. On the other hand, with the dissolution of the limited amount of the air in the bath water together with the $CO_2$ gas, there appear in the bathtub 4 only micro-bubbles which remains in the bath water over a long period, and which is thought to inhibit quick lowering of the dissolved content of the $CO_2$ gas. Two assumptions may account for this phenomenon. One is that the micro-bubbles are formed substantially from the air, and the other is that, even if the micro-bubbles substantially contain the $CO_2$ gas, the micro-bubbles remains in the bath water over a long period and therefore gives increased chances of redissolving the $CO_2$ gas into the bath water. In any event, it is revealed that at least 5% of the air is necessary in the concentrated $CO_2$ gas to be supplied to the circulation path for the purpose of keep the $CO_2$ contents in the bath water of the bathtub 4 at a desired level over a prolonged period. In the present invention, it is contemplated to dissolve the $CO_2$ gas in the bath water of the bathtub 4 upto 250 ppm or more for enhancing carbonate spring bath effect. Such $CO_2$ dissolved content can be maintained over a prolonged period for the above reason.

Since the $CO_2$ adsorption tower 50 is capable of normally supplying the mixture gas of $CO_2$ and air having a $CO_2$ concentration of 50 to 95% with sufficient amount of the air, no additional supply of the outside air is needed and therefore the air supply line L11 is kept closed. However, it is noted at this time that the above-described device is capable of providing nearly 100% of the $CO_2$ gas. In this case, the air supply line L11 may be opened to supply a suitable amount of air to the bath water in addition to the $CO_2$ gas.

Disposed in the circulation path 130 downstream of the booster pump 133 is an accumulator 160 for temporarily storing the pressurized bath water in order to separate undissolved gas which is involved in the bath water at the pressurization by the booster pump 133.

Such undissolved gas is inherently present in a large amount since an excessive amount of the mixture gas is supplied to the circulation path 130 in an attempt to dissolve more amount of the gas into the bath water by pressurization at the booster pump 133. The accumulator 160 stores the undissolved gas being separated from bath water in order to selectively feed back the undissolved gas into the circulation path 130 upstream of the pump 133 and discharge the gas outside of the path 130 For this purpose, the accumulator 160 is connected to the circulation path 130 by way of a recycle line L12 with a recycle valve V11 and is communicated with the outside air by way of an exhaust line L13 with an exhaust valve V12. The recycle line L12 and the exhaust line L13 are connected to the upper end of the accumulator 160 for flowing the undissolved gas out of the accumulator 160 selectively through the lines L12 and L13. The recycle line L12 and exhaust line L13 are selectively opened and closed such that the system is capable of selectively operating a recycle mode in which the undissolved gas is fed back to the circulating bath water and an exhaust mode in which the undissolved gas is exhausted outside of the circulation path. Such selection is made based upon the $CO_2$ concentration of the mixture gas supplied from the $CO_2$ adsorption tower 50 for effectively operating the system.

Also included in the system is a $CO_2$ monitor 190 for monitoring the dissolved content of the $CO_2$ gas in the bath water sampled from the bathtub 4. For this purpose, a $CO_2$ monitor 190 is connected through a water feed channel 191 to the circulation path 130 between the inlet 131 and the booster pump 133 to receive the bath water from the bathtub 4. A control panel 100 is provided adjacent to the bathtub 4 and receives an output from the $CO_2$ monitor 190 for indication of the monitored $CO_2$ content at a display 101 so that a user can be readily informed of the monitored $CO_2$ content. The control panel 100 includes a switch and selector section 102 for turning on and off the system as well as selecting between a carbonate spring bath of dissolving the $CO_2$ gas in the bath water while forming air micro-bubbles in the bathtub 4 and the air micro-bubbling bath of forming only air micro-bubbles without the $CO_2$ gas dissolution.

The control panel 100 is linked a control unit (not shown) which Controls the booster pump 133, valves V4 and V10, and valves V11 and V12, based upon the output from a level sensor of the accumulator 160 as well as the output from the control panel 100 and from the $CO_2$ monitor 190, in order to effectively dissolve the $CO_2$ gas into the bath water and to obtain a desired dissolved content of the $CO_2$ gas, for example, 250 ppm in the bathtub 4.

What is claimed is:

1. A device of supplying a concentrated $CO_2$ gas in a carbonate spring bath system for creating a bath water dissolved with $CO_2$ gas and supplying the same to a bathtub, said device comprising:

a $CO_2$ gas source supplying a concentrated $CO_2$ gas to dissolving means which dissolves the $CO_2$ gas supplied from said $CO_2$ gas source under a pressurized condition into the bath water being fed to said bathtub;

said $CO_2$ gas source comprising:

combustion means for obtaining from a hydrocarbon fuel a combustion gas containing a $CO_2$ gas;

a $CO_2$ adsorption tower connected to said combustion means through a gas feed line to receive said combustion gas and connected to said dissolving means through a supply line, said $CO_2$ adsorption tower being filled with an adsorbent capable of adsorbing the $CO_2$ gas from said combustion gas at a relatively low adsorption temperature and of desorbing the $CO_2$ gas therefrom at a relatively high desorption temperature for feeding the $CO_2$ gas to said dissolving means through said supply line;

cooling means disposed in said gas feed line between said combustion means and said $CO_2$ adsorption tower to cool said combustion gas prior to being fed to said $CO_2$ adsorption tower;

heating means disposed within said $CO_2$ adsorption tower in order to heat said adsorbent for desorbing said $CO_2$ gas therefrom;

a gas discharge line extending from said $CO_2$ adsorption tower in communication with said gas feed line so as to discharge said combustion gas out of said $CO_2$ adsorption tower after adsorption of the $CO_2$ gas from said combustion gas to said adsorbent;

a cooling line extending from said $CO_2$ adsorption tower and terminating in said gas feed line upstream of said $CO_2$ adsorption tower so as to be cooperative with said gas feed line to form a closed loop for circulating a residual gas through said $CO_2$ adsorption tower in order to cool said adsorbent thereby.

2. A device as set forth in claim 1, wherein said cooling line is connected to said gas feed line at a point between said combustion means and said cooling means for cooling said residual gas thereby.

3. A device as set forth in claim 1, further including an air feed line leading to said gas feed line upstream of said $CO_2$ adsorption tower and provided with an air pump for introducing an outside air through said $CO_2$ adsorption tower into said supply line, said air feed line provided with a valve which is opened during the time period of desorbing said $CO_2$ gas at said high desorption temperature from said adsorbent whereby flowing the outside air around said adsorbent for expediting the desorption of the $CO_2$ gas.

4. A device as set forth in claim 1, including a sensor for detecting a flow amount of said $CO_2$ gas from said $CO_2$ adsorption tower and providing an output indicative of the detected flow amount of the $CO_2$ gas, and further including control means which, in response to said output, controls said heating means in a feedback manner to regulate the flow amount of said $CO_2$ gas desorbed from said $CO_2$ adsorption tower.

5. A device as set forth in claim 4, wherein said sensor is a thermo sensor disposed within said $CO_2$ adsorption tower to determine said flow amount based upon a known relation between the temperature and desorption capability.

6. A device as set forth in claim 4, wherein said sensor is a flow meter disposed downstream of said $CO_2$ adsorption tower.

7. A device as set forth in claim 1, wherein control means is included to heat said adsorbent to a temperature below said desorption temperature prior to desorbing the $CO_2$ gas.

8. A device as set forth in claim 1, wherein said heating means comprises a plurality of circular heating elements arranged in a concentric relation within said $CO_2$ adsorption tower.

9. A device as set forth in claim 1, further including a steam adsorption tower filled with a steam adsorbent capable of adsorbing steam carried in said combustion gas at a relatively low steam adsorption temperature and of desorbing the steam at a relatively high steam desorption temperature, said steam adsorption tower disposed in said gas feed line upstream of said $CO_2$ gas adsorption tower for adsorbing the steam prior to the adsorption of the $CO_2$ gas at said $CO_2$ adsorption tower, said steam adsorption tower arranged in said cooling line of the closed loop such that said steam adsorption tower and said $CO_2$ adsorption tower can be simultaneously cooled by said residual gas circulating in said cooling line.

10. A device as set forth in claim 9, including a humidity sensor disposed in said gas feed line between said $CO_2$ and steam adsorption towers to monitor humidity of said combustion gas being fed to said $CO_2$ adsorption tower past said steam adsorption tower, and further including control means which controls to stop feeding the combustion gas when the monitored humidity exceeds a critical level.

11. A device as set forth in claim 10, further including an air feed line leading to said gas feed line upstream of said steam adsorption tower for introducing an outside air into said gas feed line, an air discharge line extending from said steam adsorption tower and terminating in an outside air, and a first valve in said gas feed line between said steam and $CO_2$ adsorption towers, said air feed line provided with an air pump and a second valve, said air pump and first and second valves being controlled in such a manner that, when desorbing the steam at said high desorption temperature, said air pump is activated with said first and second valves closed and opened, respectively in order to flow the outside air from said air feed line through said steam adsorption tower and outwardly of said discharge line, whereby flowing the outside air around said steam adsorbent for expediting the desorption of the steam therefrom.

12. A device as set forth in claim 11, wherein said air discharge line is provided with a third valve which is opened to enable the discharging of the outside air through said steam adsorption tower and is closed to enable the outside air flowing through said $CO_2$ adsorption tower with said first valve opened for expediting the desorption of the $CO_2$ gas from the $CO_2$ desorption tower at the time of supplying the $CO_2$ gas being desorbed from said $CO_2$ desorption tower into said supply line.

13. A device as set forth in claim 12, including a humidity sensor disposed in said gas feed line between said $CO_2$ and steam adsorption towers to monitor humidity of said combustion gas being fed to said $CO_2$ adsorption tower past said steam adsorption tower, memory means for storing the monitored humidity, and control means operating in accordance with said monitored humidity to control said steam desorption temperature and the amount of the outside air being introduced through said air feed line.

14. A device as set forth in claim 10, including a thermo sensor for monitoring a temperature of said steam adsorption tower and control means which, in response to the monitored temperature, regulates the flow amount of said combustion gas into said steam adsorption tower based on a known relation between the temperature and steam adsorption capacity.

15. A device as set forth in claim 1, including a blower disposed in said cooling line terminating in said gas feed line for flowing said gas and residual gas through said $CO_2$ adsorption tower, respectively at the time of adsorbing of the $CO_2$ gas and cooling of the $CO_2$ adsorption tower, said blower causing a vibratory motion which is transmitted through a rigid member to said cooling means for enhancing the cooling effect thereat.

16. A device as set forth in claim 1, wherein said supply line is provided with a constrictor for regulating the $CO_2$ gas flowing into said dissolving means.

17. A device as set forth in claim 1, wherein said supply line is provided with means for removing toxic gas contained in the $CO_2$ gas being supplied into said dissolving means.

18. A device as set forth in claim 1, wherein said $CO_2$ adsorption tower comprises a cylinder which has a circular cross section perpendicular the flow direction of the gas passing through said $CO_2$ adsorption tower and which incorporate said adsorbent and said heating means, said adsorbent being filled into said cylinder to form a circular layer therein, said heating means comprising plural turns of heating annuluses of wire element arranged in a concentric relation with each of the annuluses disposed in the cross section of said cylinder so to define an outermost annulus and inner annuluses, said outermost annulus being dimensioned to have a diameter D which is determined relative to a diameter Da of said adsorption layer in terms of the following relation $$D \geq \sqrt{\frac{3}{4}}\, Da.$$

19. A device as set forth in claim 18, wherein each of said annuluses has a diameter Di which is determined relative to the diameter Da of said adsorption layer by the following relation $$Di \geq \left( \sqrt{\frac{(2i-1)}{2N}} \right) Da$$

wherein i is an integer starting from 1, 2, . . . N for identification of the annuluses in the radial order as counted radially outwardly from the innermost annulus, and N is a total number of the annuluses.

20. A device as set forth in claim 19, wherein said annuluses are formed from a single convoluted heating wire.

21. A device as set forth in claim 19, wherein said cylinder includes a heat conductive member surrounding the outermost annulus in heat transfer contact therewith.

22. A device as set forth in claim 21, wherein said heating wires has a pair of terminal ends which extend through a flange to be supported thereby, said flange secured on the interior surface of said cylinder with said terminal ends extending through corresponding holes in said cylinder, said holes being filled with an adhesive for sealing off said holes.

* * * * *